W. H. BRISTOL.
PRESSURE GAGE.
APPLICATION FILED MAR. 7, 1912.

1,045,770.

Patented Nov. 26, 1912.

Witnesses:
John E. Prager
A. Worden Gibbs

Inventor
William H. Bristol
By his Attorney
Fredk P. Schuck

UNITED STATES PATENT OFFICE.

WILLIAM H. BRISTOL, OF WATERBURY, CONNECTICUT, ASSIGNOR TO THE BRISTOL COMPANY, OF WATERBURY, CONNECTICUT, A CORPORATION OF CONNECTICUT.

PRESSURE-GAGE.

1,045,770. Specification of Letters Patent. Patented Nov. 26, 1912.

Application filed March 7, 1912. Serial No. 682,235.

*To all whom it may concern:*

Be it known that I, WILLIAM H. BRISTOL, a citizen of the United States, and a resident of Waterbury, in the county of New Haven and State of Connecticut, have invented certain new and useful Improvements in Pressure-Gages, of which the following is a specification.

The invention relates to gages for indicating or recording the pressure under which a particular fluid is placed, and variations thereof; and relates more particularly to that type of pressure gage wherein an indicating or recording arm is actuated by the movement of a suitable member subjected to the fluid under pressure, said movement being a function of the change of pressure of said fluid. In such apparatus the indicating or recording arm has, as a rule, a substantially uniform movement; and it is the object of the present invention to so modify the movement of the actuating member that one portion of its range of movement will be markedly different from the rest for equal increments of pressure, for example—the portion of the movement with respect to pressures below atmosphere shall be open and occupy one-third of the total range; and the remaining two-thirds shall be contracted and serve to indicate and record relatively high pressures—up to 500 lbs., or more. Gages of such a character are particularly desirable for a number of purposes, for example—in connection with the creosoting of wood. In this process, the wood is first subjected to a vacuum treatment to remove the air from the pores, whereupon the material is forced therein under extremely high pressure. A gage of the character herein set forth will be extremely well suited for such purposes, as a single gage will serve to measure both the vacuum and the high pressure, the former, also, with considerable accuracy because of the open scale possible.

The nature of the invention will best be understood when described in the accompanying drawings, in which—

Figure 1:
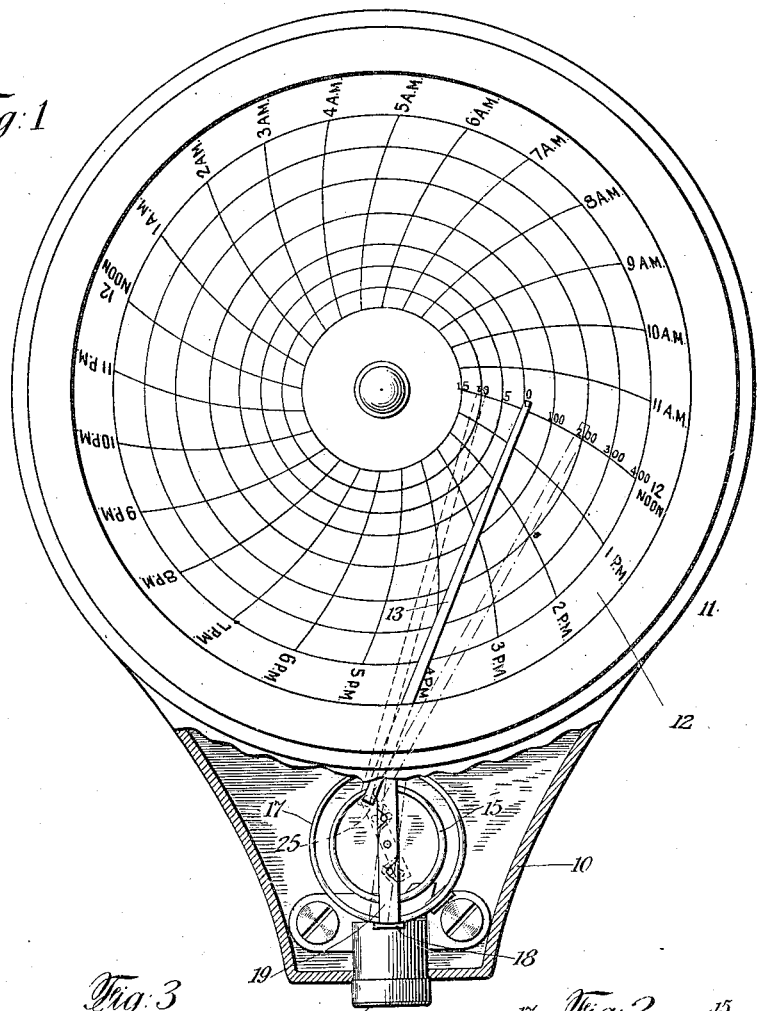
Figure 3:
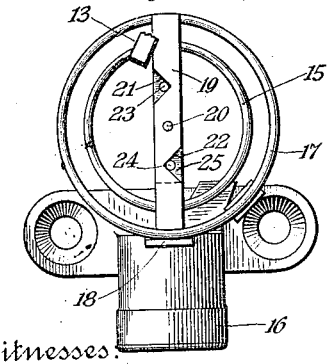
Figure 2:
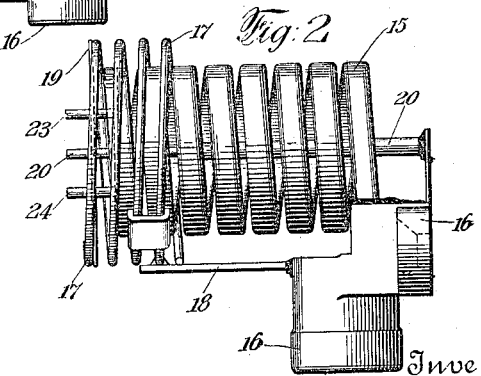

Figure 1 is a front elevation of a recording pressure gage, a portion of the casing being broken away to show the actuating mechanism. Fig. 2 is a detail side elevation; and Fig. 3 is a detail plan of the mechanism.

Similar characters of reference designate corresponding parts throughout the several views.

Referring to the drawings, 10 designates a suitable casing to the back of which is secured the actuating mechanism hereinafter described. The gage 11 is shown as of the recording type with rotatable record disk 12, over which an inking pointer or arm 13 is arranged to move according to the variations in pressure. The zero or neutral position of the arm in the present embodiment is not located, as is usual, at the beginning of the graduations of the chart, but some distance upon the same, the chart being graduated in opposite directions from this neutral point; and the arm, in accordance with the present invention is arranged to move in either direction from this initial position.

It will be noted from an inspection of the chart that the graduations to the left of the zero position are very much more open for corresponding increments of pressure than those to the right. In the present embodiment, the graduations to the left of the zero represent pressures down to 15 lbs. vacuum, and occupy approximately one-third of the total range of movement of the arm 13. The remaining two-thirds portion of the chart is graduated for pressures above atmosphere and to a maximum pressure of 400 lbs.

To effect this unequal or non-uniform movement of the arm with equal increments of pressure, the usual unit actuating mechanism is modified as hereinafter set forth. In the gage shown, the actuating mechanism consists of a well-known type comprising a helical tube 15 closed at the free end and secured at its other end to the mounting, said latter end communicating with a suitable fluid inlet 16. To the free end of the tube 15 is attached, as is usual, the arm 13 which partakes of the contraction or expansion of the helical tube under variations in pressure. This movement of the tube 15 and arm 13 is perfectly free and unrestrained in one direction, except of course for the resistance offered by the tube 15 itself; and in the present instance, this movement is indicated in a direction such that pressures below atmospheric pressure will be measured. To provide the contracted portion of the scale for pressure above atmosphere, I have arranged to load the helical tube 15 immediately upon its movement in the opposite direction from the neutral point. To this end, a coiled spring 17 is concentrically mounted about the free end of the helical tube 15, one end of the same being secured to a projecting member 18 extending from the mounting and the other end to a cross-bar 19. A central rod 20 secured to the mounting is arranged to pass through the tube 15 and spring 17 in the longitudinal axis of the same and to pass through the cross-bar 19, which latter thus turns about the same. Bar 19, furthermore, is provided with two notches 21 and 22 respectively, upon opposite sides of rod 20 and oppositely disposed. From a bar 25 extending from the free portion of the helical tube 15 and through which rod 20 passes, two pins 23 and 24 are arranged to project and to engage the corresponding notches 21 and 22. When the helical tube 15 turns in one direction, these pins move out of their corresponding notches and do not engage the cross-bar 19, the resistance to motion of the pointer being merely that inherent in the helical tube 15. When the movement is in the reverse direction, however, the pins in their corresponding notches engage the cross-bar and thereby add to the inherent resistance of helical spring 15 that of the spring 17, whereby a greater pressure is required to effect an equal movement of the helical tube 15.

I claim:—

1. The combination with a pressure gage comprising a helical tube closed at one end and adapted to receive fluid under pressure, one end of the tube being free and the other fixed, and an indicating or recording arm connected therewith and adapted to move in opposite directions from a neutral point; of a spring about said helical tube and adapted to be engaged thereby upon movement of the arm on one side of its neutral point.

2. The combination with a pressure gage comprising a helical tube closed at one end and adapted to receive fluid under pressure, one end of the tube being free and the other fixed, and an indicating or recording arm connected therewith and adapted to move in opposite directions from a neutral point; of a spring surrounding said helical tube, a cross-bar attached to the said spring, and means extending from the helical tube to engage the said cross-bar upon movement of the arm on one side of its neutral point.

3. The combination with a pressure gage comprising a suitable casing, a helical tube closed at one end and adapted to receive fluid under pressure, one end of the tube being free and the other fixed to said casing, an indicating or recording arm connected to the free end of said tube; of a coiled spring about said tube and concentric therewith, one end of the same being connected to the casing, a rod extending in the axis of said tube and spring, a cross-bar secured to the free end of said coiled spring and through which said rod passes, said bar being provided upon opposite sides of the rod with oppositely disposed notches, and rods extending from said helical tube to engage the notches of said cross-bar.

Signed at New York, in the county of New York, and State of New York, this 5th day of March, A. D. 1912.

WILLIAM H. BRISTOL.

Witnesses:
LAURA E. SMITH,
FREDK. F. SCHUETZ.

---

Copies of this patent may be obtained for five cents each, by addressing the "Commissioner of Patents, Washington, D. C."